March 17, 1970     W. HERMANNS     3,501,061
CONTAINER FOR TRANSPORTING POWDERY SUBSTANCES OR MIXED CARGO
Filed Nov. 2, 1967     3 Sheets-Sheet 1
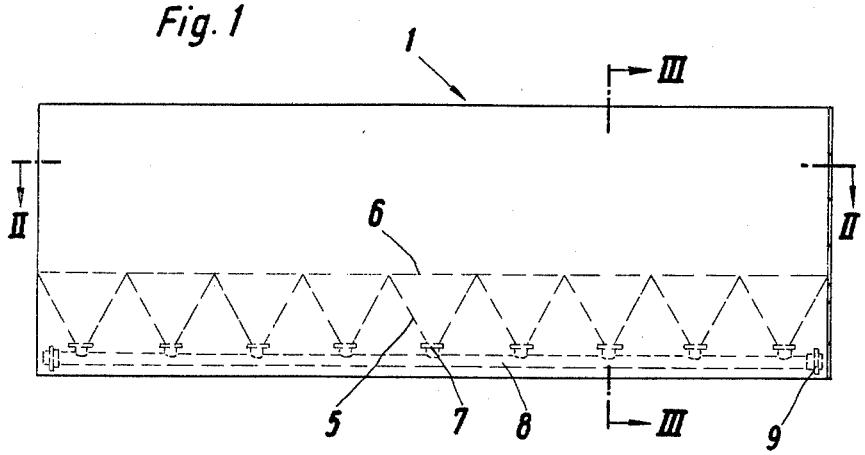
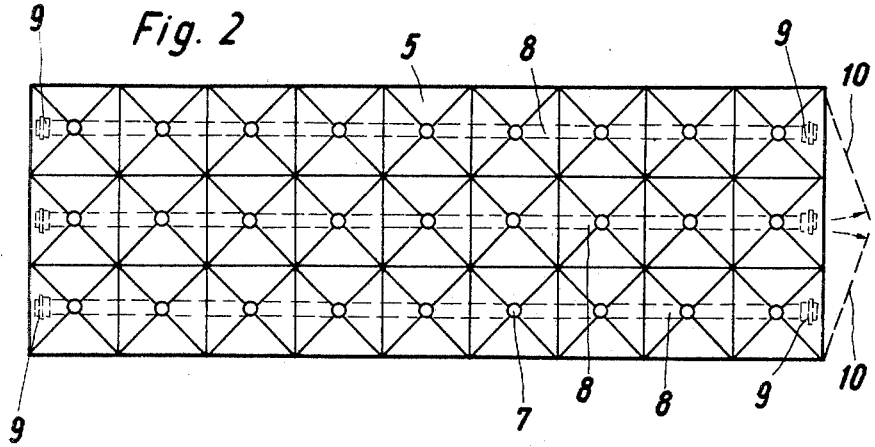
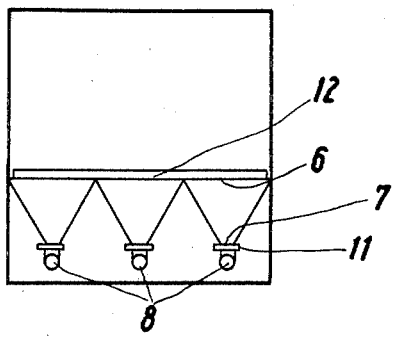
Inventor:
WILHELM HERMANNS
BY
Mason, Porter, Diller & Brown
ATTORNEYS March 17, 1970 W. HERMANNS 3,501,061
CONTAINER FOR TRANSPORTING POWDERY SUBSTANCES OR MIXED CARGO
Filed Nov. 2, 1967 3 Sheets-Sheet 2

Inventor:
WILHELM HERMANNS
BY Mason, Porter, Diller & Brown
ATTORNEYS

United States Patent Office 3,501,061
Patented Mar. 17, 1970

3,501,061
CONTAINER FOR TRANSPORTING POWDERY
SUBSTANCES OR MIXED CARGO
Wilhelm Hermanns, Frankfurter Str. 6–14,
Porz (Rhine), Germany
Filed Nov. 2, 1967, Ser. No. 680,193
Claims priority, application Germany, July 28, 1967,
H 63,428; Oct. 9, 1967, H 64,120
Int. Cl. B67d 5/60
U.S. Cl. 222—144.5                                 5 Claims

ABSTRACT OF THE DISCLOSURE

A shipping container for powdery material or mixed cargo, the carrier including an apertured grate member disposed above a plurality of funnels, the funnels being provided with means for discharging powdery material, and the grate member being capable of supporting cargo other than powdery material.

---

This invention is related to a container for transporting powdery substances or mixed cargo. Such containers have been introduced recently as transporting means and practically comprise large, approximately square-shaped vessels which can be placed by means of special couplings or securing means onto an undercarriage for street or railroad transporting facilities or removed therefrom and transported by ship or airplane.

These containers are suited for transporting mixed cargo which is put into the containers from the top or from the side and is unloaded at the destination. In these containers powdery material or granulate may also be transported, provided it is previously filled into sacks or drums which are then placed into the container like other mixed cargo.

The loading and unloading of a container could be effected more quickly and thus the transporting cost again be reduced if powdery or granulate bulk material could be directly dumped into the container. Loading bulk material into the containers presently available is readily possible, but unloading the bulk material from these containers is difficult.

The invention is concerned with the problem of constructing and improving the containers such that they are also suited for accepting powdery or granulate bulk material and can be unloaded just as quickly as they can be loaded.

An object of the invention for solving the foregoing problem is to provide a plurality of discharge funnels arranged next to and behind one another in the bottom portion of the container, the upper margins of which merge into one another and underneath the bottom discharge openings of which conduits connected therewith are provided which are provided with connectors at their free ends, preferably at the small side of the container, for connecting evacuating conduits.

The filling of such a container is effected in a simple manner from the top, for instance by swinging upwardly the lid or via special manholes. The discharging is accomplished such that an evacuating system is connected to the connectors of the conduits and the entire bulk material contained in the container is evacuated by this evacuating system.

All connectors at the conduits may either be connected to the common evacuating system via a plurality of hoses simultaneously or in a sequence.

The container according to the invention moreover has the same overall dimensions and structural features as the standardized containers already available, and it is merely constructed differently in its bottom portion as compared to available containers.

The funnels and the conduits may consist of steel, light metal, plastic and possibly even wood or other materials, depending on specific requirements and desires.

It is preferably proposed to provide specific shutoff members between the funnels and the conduits. By accordingly controlling these shutoff members, it can be assured that the unloading of the container is effected following a certain pattern for instance such that initially the one end of the elongated container, then its middle portion and finally the other end is unloaded.

According to the invention, pneumatic unsettling means are furthermore provided in the funnels for facilitating a discharging. Such pneumatic unsettling means known per se for instance comprise special porous inserts in the funnels which permit the introduction of compressed air into the superimposed bulk material. The compressed air in this case is supplied through special conduits to the bottom of the funnel underneath the insert.

There will be instances in practice where a container is filled with powdery material or granulate bulk material for a part of the transport way such as the delivery way, but does not contain such a load for another part of the way such as the return. In order to not let this container return empty in such a case, but be able to use it for transporting normal mixed cargo such as boxes or the like, a proposal according to the invention is to dispose coverings onto the upper openings of the funnels. These coverings in the simplest embodiment comprise plates resting on the upper margins of the funnels arranged next to and behind one another and forming a continuous flat bottom surface.

According to the invention it is proposed to form the covering by a grate arranged on the bottom and covering the upper opening of all funnels. This grate can firmly be connected to the container so that powdery or granulate bulk material as well as mixed cargo can be loaded into the container without re-equipping it or additionally inserting plates for forming a continuous flat bottom surface.

In order to keep the amount of powdery material remaining in the container as small as possible when unloading it and in order to on the other hand increase the load capacity of the grate, it comprises uprightly arranged strip-shaped material according to a further feature of the invention.

A further provision of the invention is that the funnels are arranged removable. Thus, the funnels and possibly also the shutoff members and the conduits located beneath the funnels may be removed for the purpose indicated, so that a normal container is provided with a full loading capacity.

A further advantage of this removable construction is that containers already available may subsequently be converted into a container according to the invention by inserting such removable funnels so that a container converted in this manner is advantageously suited for transporting powdery or granulated bulk material.

According to the invention, an evacuating system is associated to the container which simultaneously or selectively may be connected to the conduits which in turn are connected to the discharge openings of the funnels.

Preferably, this evacuating system is an evacuating and pressurizing arrangement thus comprising a vessel capable of selectively being evacuated or pressurized and an associated suction or pressure pump means. By means of such an evacuating and pressurizing arrangement initially a portion of the container contents and possibly the entire container contents may be sucked into the vessel indicated and subsequently discharged into a silo or other vessels under pressure from this container after accordingly varying the arrangement.

Further objects, features and advantages of the invention not specifically mentioned here will be apparent from the detailed description and claims which follow, references being had to the accompanying drawings in which a preferred embodiment of the invention is shown by way of example only and in which:

FIG. 1 is a diagrammatically simplified side view of a container according to the invention;

FIG. 2 is a plan view on the open container as illustrated in FIG. 1;

FIG. 3 is a cross sectional view taken along the line II—III of FIG. 1;

Figure 4:
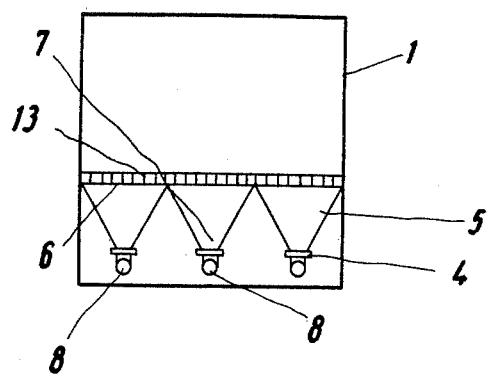
FIG. 4 is a cross sectional view similar to FIG. 3 with a grate as covering for the upper openings of the funnels.

The container illustrated in the drawing has a wall of metal, plastic, wood or the like like the available containers, reinforcements (not illustrated) being provided at the corners and edges in a well known manner.

The container thus is a simple transport vessel which is merely designed to receive the weight of the load, but which does not additionally have to be subjected to a pneumatic overpressure for discharging. Due to the fact that the container is not unloaded by overpressure, but by means of an evacuating system, it is not necessary to design the walls so strong as this would be necessary for pressure vessels. This avoids a cost increase of the container.

In the bottom third of the container illustrated in the drawing, pyramidal funnels 5 are arranged in three rows next to one another. The walls of which at the upper margins are sealingly connected to one another. Shutoff members 11 (FIG. 3) are positioned underneath the discharge openings 7 to which three conduits 8 are connected. These conduits extend through the container parallel to one another in longitudinal direction and are provided with a connector 9 each at their two ends.

The funnels are firmly installed in the container in the embodiments illustrated, but of course can also be arranged removable either individually or in groups. In such a case the assembled funnels must be accordingly sealed at the abutting margins.

For loading the container, manholes or sockets can be provided in the top portion for pneumatically filling it which have been omitted in the drawings for the sake of simplicity. For loading the container with mixed cargo, the wall of a small side is designed as a dust-tight twin door 10. Before loading the container with mixed cargo, the funnels 5 can be closed by a covering 12 as illustrated in FIG. 3.

Figure 5:
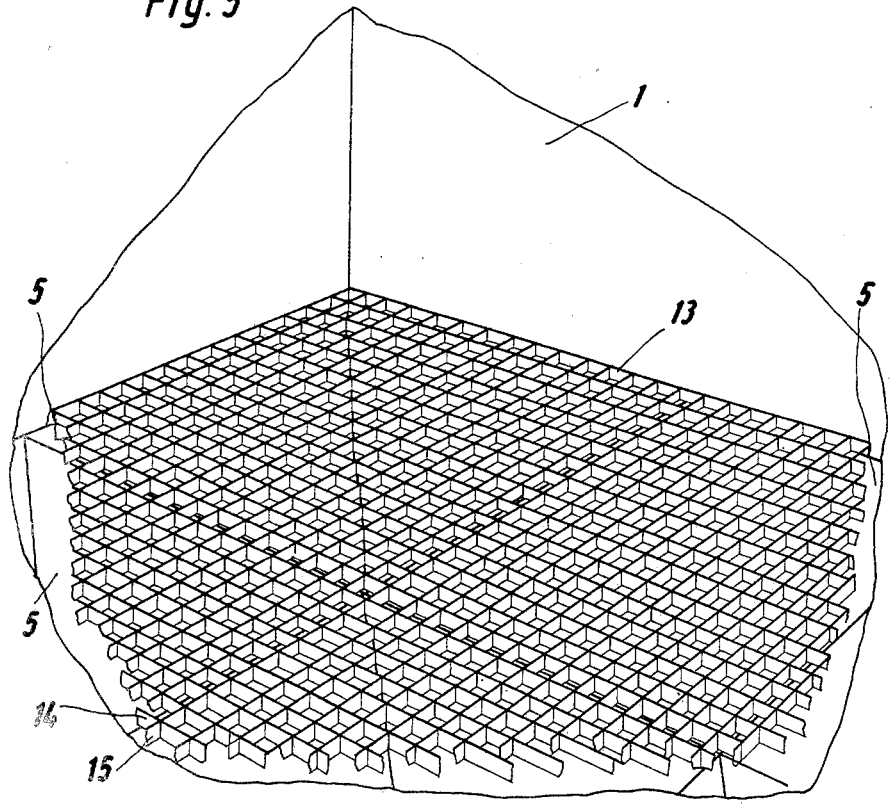
FIG. 5 is a perspective view of a portion of the bottom covered by the grate.

In the embodiment illustrated in FIGS. 4 and 5 a grate 13 is provided at the bottom which extends across the entire surface of the bottom instead of the covering 12 assembled of a plurality of parts and covering the upper opening 7 of the funnels. In this embodiment illustrated in the drawing, the grate 13 is firmly connected to the container. As best illustrated in FIG. 5, the grate 13 is made of uprightly positioned strip-shaped material.

In the embodiment illustrated in the drawing the individual strips 14, 15 are positioned rectangularly relative to one another and thus are parallel to the side and traverse walls of the container; they may, however, also be arranged at an acute angle relative to one another. For this case, a special frame is expedient. Only small amounts of powdery material can remain on the horizontally disposed side surfaces by uprightly positioning the strips 14, 15 when emptying the container, so that the remaining powdery material is limited to a minimum.

After discharging the powdery material, the container can be directly used for loading mixed cargo according to the embodiment illustrated in FIGS. 4 and 5 by opening the twin door 10 at a small side without necessitating any alteration or any additional installation.

Figure 6:
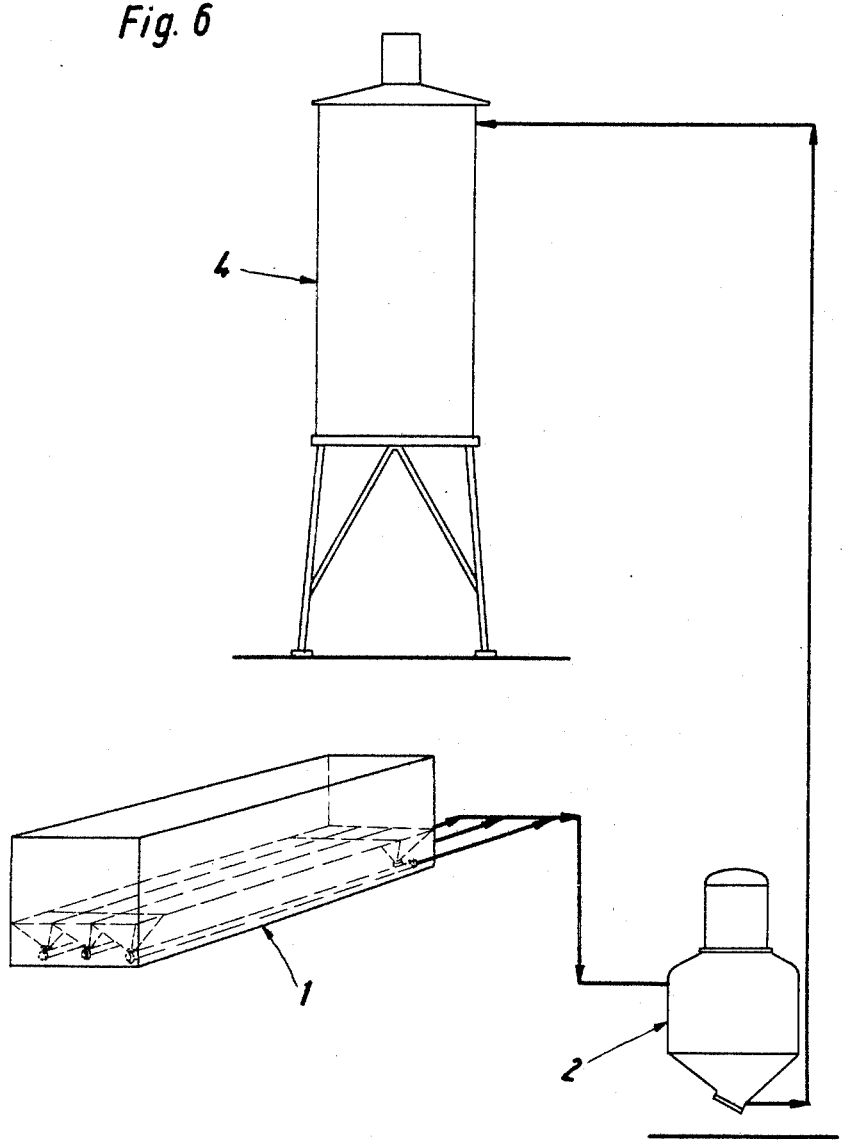
FIG. 6 is a container as illustrated in FIGURES 1 to 5 with an associated evacuating and pressurizing arrangement and a connected silo.

The container is emptied by an evacuating system 2 as indicated in FIG. 6 of the drawings which transmits the material into a silo 4. This evacuating system can advantageously be provided as evacuating and pressurizing arrangement. It then includes a pressure vessel with lines entering same at the top and at the bottom, a suction and a pressure pump means and associated control members such as slide valves, cocks or the like which have not been illustrated in the drawing in detail.

Such an evacuating and pressurizing arrangement operates such that initially the pump is connected to the pressure vessel with its suction side which in turn is connected to the container via a conduit. Due to the vacuum, the bulk material is sucked from the container into the pressure vessel. For this purpose, the container is of course provided with venting openings (not illustrated) in its top wall.

Then the connecting line from the container to the pressure vessel is closed, the pump is connected to the pressure vessel with its pressure side and the line connected to the bottom discharge of the pressure vessel is connected to the receiver to be filled such as the silo 4 in the FIG. 6. By the overpressure in the pressure vessel the bulk material therein is pressed out of it and is conveyed to the silo 4 or the like via the connecting line.

By using a container according to the invention possibly in conjunction with the foregoing described evacuating and pressurizing arrangement the available container system is utilized with a much better efficiency. Experience has been that the containers available are loaded with mixed cargo only to about two thirds of their volume. In this case even the firm installation of the funnels in the bottom third of the container does not bring about any loss. If on the other hand other utilization efficiencies are to be expected, the container having removable funnels can be used.

While a preferred embodiment of the invention has been shown and described, this has been done by way of example only, as there are many modifications and adaptations which can be made by one skilled in the art within the teaching of the invention.

What is claimed is:

1. A shipping container for powdery material or mixed cargo, said shipping container comprising a box-like structure having a top wall, a bottom wall and a plurality of side walls and end walls, funnel means disposed within said container completely above said bottom wall, connection means for connecting discharge conduits to said funnel means, at least one of said end walls being comprised of dust-tight door means for providing access to the interior of said shipping container to allow placement therein of mixed cargo.

2. A shipping container for powdery material or mixed cargo, said shipping container comprising a box-like structure having a top wall, a bottom wall and a plurality of side walls and end walls, funnel means disposed within said container completely above said bottom wall, connection means for connecting discharge conduits to said funnel means, said funnel means being comprised of a plurality of funnels the upper margins of which are connected together, and at least one discharge conduit being located within said shipping container below said funnels and connected thereto by said connection means.

3. A shipping container as defined in claim 2 wherein said discharge conduit is disposed horizontally beneath said funnels and above said bottom wall, and said discharge conduit having a discharge opening located adjacent at least one of said side walls or end walls.

4. A shipping container for powdery material or mixed cargo, said shipping container comprising a box-like structure having a top wall, a bottom wall and a plurality of side walls and end walls, funnel means disposed within said container completely above said bottom wall, connection means for connecting discharge conduits to said funnel means, said funnel means being located within a lower section of said shipping container, a grate member, said grate member having a plurality of apertures therein for allowing powdery material therethrough, said grate member being disposed above said funnel means substantially horizontally for providing a support surface capable of sustaining cargo which is too large to pass through said apertures, said grate member resting upon and being supported by said funnel means.

5. A shipping container for powdery material or mixed cargo, said shipping container comprising a box-like structure having a top wall, a bottom wall and a plurality of side walls and end walls, funnel means disposed within said container completely above said bottom wall, connection means for connecting discharge conduits to said funnel means, said funnel means being located within a lower section of said shipping container, a grate member, said grate member having a plurality of apertures therein for allowing powdery material therethrough, said grate member being disposed above said funnel means substantially horizontally for providing a support surface capable of sustaining cargo which is too large to pass through said apertures, said grate member being comprised of uprightly positioned strip-shaped material for providing said grate member with high bearing strength without providing a large horizontal surface area which would interfere with passage of powdery material through said grate member.

References Cited

UNITED STATES PATENTS

| | | | |
|---|---|---|---|
| 2,774,628 | 12/1956 | Engstrum | 222—189 |
| 2,089,347 | 8/1937 | Dondlinger | 222—195 |
| 2,984,389 | 5/1961 | Loomis | 222—193 X |
| 3,194,420 | 7/1965 | Kemp et al. | 222—193 X |

STANLEY H. TOLLBERG, Primary Examiner